United States Patent
Bianchi et al.

(10) Patent No.: US 7,355,611 B2
(45) Date of Patent: Apr. 8, 2008

(54) METHOD AND ARRANGEMENT FOR IMPROVING IMAGE QUALITY ON A DISPLAY OF AN IMAGING DEVICE

(75) Inventors: Mark J Bianchi, Fort Collins, CO (US); Wilfred F Brake, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 10/303,747

(22) Filed: Nov. 26, 2002

(65) Prior Publication Data

US 2004/0100478 A1    May 27, 2004

(51) Int. Cl.
    *G09G 5/10* (2006.01)
(52) U.S. Cl. .................. 345/690; 345/88; 348/649
(58) Field of Classification Search ........... 348/333.01, 348/333.02, 333.11, 333.12, 673, 649–651, 348/678, 687; 345/12, 20, 89, 102, 690, 345/88
See application file for complete search history.

(56) References Cited

U.S. PATENT DOCUMENTS

| | | | |
|---|---|---|---|
| 5,499,040 A * | 3/1996 | McLaughlin et al. ....... | 715/823 |
| 5,801,767 A * | 9/1998 | Wu .............. | 348/190 |
| 5,828,351 A * | 10/1998 | Wu .............. | 345/11 |
| 5,983,263 A * | 11/1999 | Rothrock et al. ........... | 709/204 |
| 5,986,636 A * | 11/1999 | Wu .............. | 345/691 |
| 6,094,185 A * | 7/2000 | Shirriff ....... | 345/102 |
| 6,281,895 B1 * | 8/2001 | Jeong .......... | 715/810 |
| 6,337,718 B1 * | 1/2002 | Kim ............ | 348/569 |
| 6,411,306 B1 * | 6/2002 | Miller et al. ............... | 345/690 |
| 6,552,738 B1 * | 4/2003 | Lin et al. .................... | 715/810 |
| 6,618,045 B1 * | 9/2003 | Lin .............. | 345/207 |
| 6,657,658 B2 * | 12/2003 | Takemura ............... | 348/207.99 |
| 6,683,585 B1 * | 1/2004 | Nakano ........ | 345/10 |
| 6,778,216 B1 * | 8/2004 | Lin .............. | 348/333.11 |
| 6,819,305 B2 * | 11/2004 | Wicker ........ | 345/3.1 |
| 6,862,039 B2 * | 3/2005 | Shimizu ........ | 348/223.1 |
| 6,879,348 B1 * | 4/2005 | Niida .......... | 348/552 |
| 7,113,181 B2 * | 9/2006 | Tey et al. .................. | 345/204 |
| 7,173,638 B2 * | 2/2007 | Jeong .......... | 345/690 |
| 7,190,372 B2 * | 3/2007 | Choi et al. ................. | 345/589 |
| 2001/0015761 A1 * | 8/2001 | Yasuda ........ | 348/333.01 |
| 2001/0043277 A1 * | 11/2001 | Tanaka et al. .......... | 348/333.01 |
| 2002/0047590 A1 * | 4/2002 | Kawano ........ | 315/169.4 |
| 2002/0101516 A1 * | 8/2002 | Ikeda .......... | 348/223 |
| 2002/0163527 A1 * | 11/2002 | Park ............ | 345/594 |
| 2002/0171747 A1 * | 11/2002 | Niikawa et al. ......... | 348/333.01 |
| 2002/0180750 A1 * | 12/2002 | Rozzi .......... | 345/589 |
| 2002/0191084 A1 * | 12/2002 | Kurokawa ............. | 348/222.1 |
| 2003/0025718 A1 * | 2/2003 | Mori ............ | 345/690 |
| 2003/0076315 A1 * | 4/2003 | Yu .............. | 345/211 |
| 2005/0151728 A1 * | 7/2005 | Nenonen .................. | 345/204 |

* cited by examiner

*Primary Examiner*—Sumati Lefkowitz
*Assistant Examiner*—Rodney Amadiz

(57) ABSTRACT

In the method and arrangement, a value of at least one image parameter of a liveview scene that is displayed on an imaging device display is determined. Based on the determined image parameter value, compensation value for the image parameter is determined, and the value of the image parameter is changed in accordance with the compensation value.

5 Claims, 4 Drawing Sheets

METHOD AND ARRANGEMENT FOR IMPROVING IMAGE QUALITY ON A DISPLAY OF AN IMAGING DEVICE

CROSS REFERENCE TO RELATED CASES

The present invention is related to U.S. patent application Ser. No. 10/125,488 of Mark J. BIANCHI et al., entitled "ADAPTIVE CONTROL OF LCD DISPLAY UTILIZING IMAGE SENSOR MEASUREMENTS," filed on Apr. 19, 2002, the entire contents of which is incorporated by reference herein.

BACKGROUND

Current imaging devices, such as a digital still camera (DSC) include a picture-taking mode in which a "liveview" video image is displayed on a color LCD. The liveview image is provided in order to facilitate the framing and capturing of an image. In this picture-taking mode, it is desirable that the liveview image looks as natural as possible to a user of the DSC. In order to provide a displayed view that is as close as possible to a liveview, e.g., a view of an object that a human being would see with a naked eye, parameters such as the DSC's video frame rate (so that motion is displayed in a realistic manner), image lag (so that motion is not delayed before it is displayed), color balance (e.g., color hue or hue), and tonal reproduction (e.g., brightness and contrast) of the image need to be controlled.

Conventionally, correcting an image (e.g., correcting the color hue, contrast and brightness), while maintaining a high video frame rate and minimal image lag, typically involves using either a dedicated liveview hardware pipeline (i.e., data processing circuitry that performs white balance correction, pixel demosaicing, color matrixing, and tone correction operations) or by employing a high performance microprocessor such as a digital signal processor (DSP) in order to manipulate all the data of the liveview image frames in a manner similar to that performed by the hardware pipeline. For imaging devices that do not contain either a dedicated liveview hardware pipeline or a DSP, the liveview frame rate and image lag, and hence displayed image quality typically suffers.

Additionally, in very low light situations, liveview video may require an increase in image device exposure time (e.g., length of time a charged coupled device (CCD) is exposed to the scene). The increased exposure time is necessary in order to maintain a sufficiently bright liveview image on a display of the device. As exposure time is increased beyond a certain point; however, the frame rate must accordingly be reduced proportional to the exposure time. A result of this reduction in frame rate is a less realistic video product.

SUMMARY

A method and arrangement for improving image quality on a display of an imaging device having at least one adjustable parameter is described. In accordance with the method and arrangement, a value of at least one image parameter of a liveview scene that is displayed on the imaging device display is determined. Based on the determined image parameter value, a compensation value for the adjustable parameter is determined, and the value of the adjustable parameter is changed in accordance with the compensation value.

DETAILED DESCRIPTION

Figure 1:
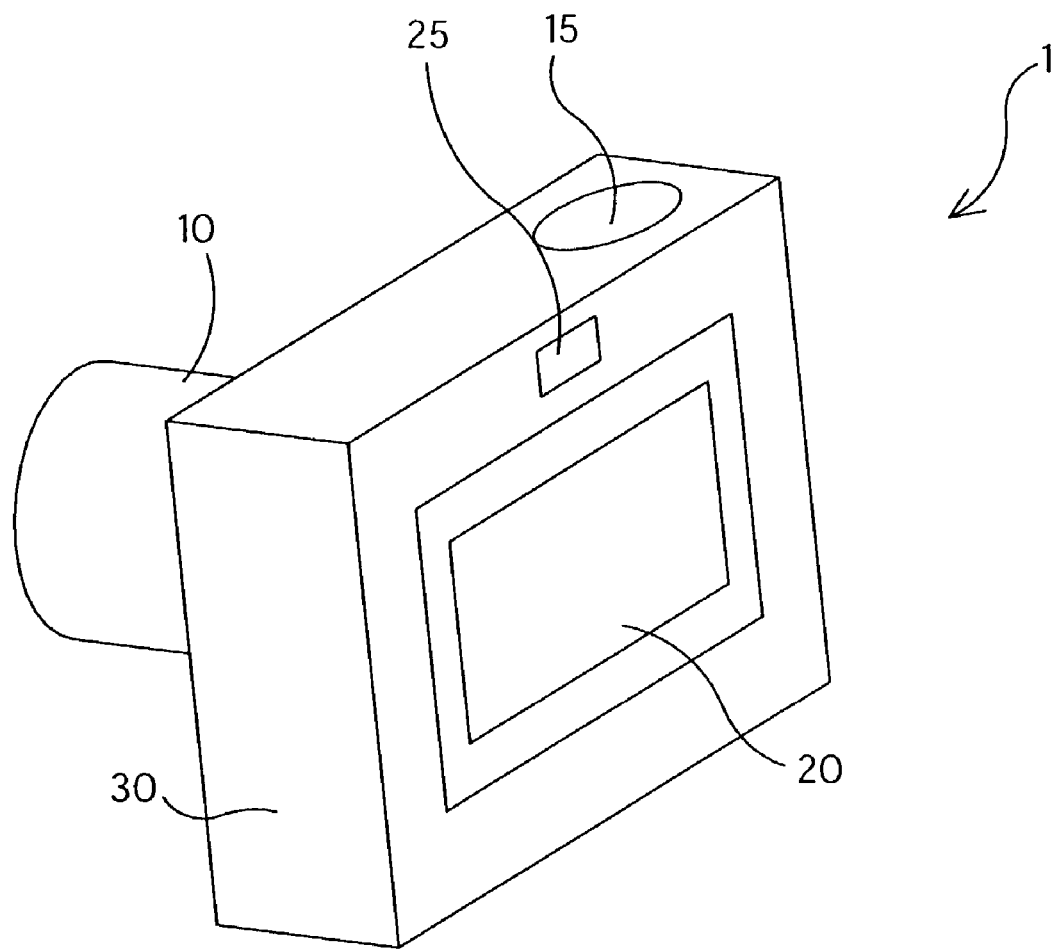
FIG. 1 is a rear perspective view of a digital camera in accordance with an exemplary embodiment of the present invention.

FIG. 1 is a rear perspective view of a digital camera 1 in accordance with the present invention. The digital camera 1 includes a lens 10 that is attached to the front of the digital camera 1. The digital camera 1 includes a camera body 30 that has a camera actuating button 15, a display, e.g., a liquid crystal display (LCD) device 20 and a viewfinder 25. The LCD device 20 may be manipulated for brightness, contrast, color hue, and the LCD device 20 may employ a backlighting mechanism. Additionally, this backlighting mechanism may employ technology for controlling illumination strength, e.g., pulse-width modulation (PWM) of the backlight's enable signal. In this way, the illumination can be set from 100% (fully on) to 0% (fully off).

Figure 2:
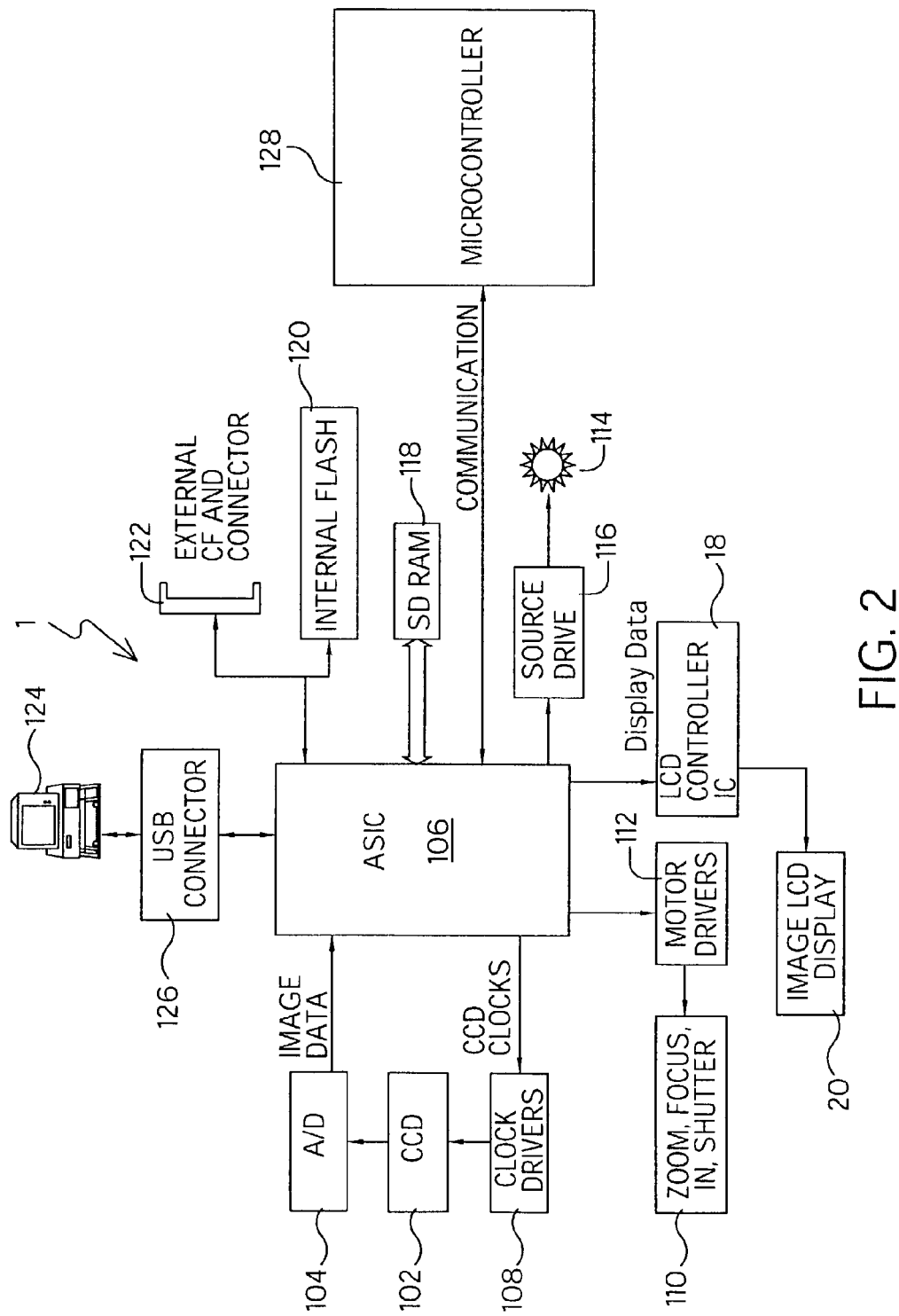
FIG. 2 is a block diagram of the architecture of a digital camera in accordance with an exemplary embodiment of the present invention.

FIG. 2 is a block diagram of an exemplary architecture of the digital camera 1. The digital camera 1 of FIG. 1 includes a device converting optical energy to electrical energy, e.g., a charge-coupled-device (CCD) 102. CCD 102 provides an analog signal to an analog-to-digital (A/D) converter 104, and the A/D converter 104 provides digitized output of the CCD 102 to an application-specific integrated circuit (ASIC) 106. The ASIC 106 may provide clock signals to clock drivers 108 that are used to operate the CCD 102. Additionally, ASIC 106 may send control values for controlling camera display attributes (e.g., color hue, brightness and contrast settings) to an LCD controller IC 18, which in turn controls and adjusts these color hue, brightness and contrast settings of LCD device 20.

The digital camera 1 also includes: zoom (optional), focus, iris and shutter mechanisms 110 that may be operated via motor drivers 112 by the ASIC 106; and a strobe unit 114 that may be operated via a strobe drive 116 controlled by the ASIC 106. As for memory devices, the digital camera 1 may include a volatile such as a synchronous dynamic random access memory (SDRAM) device 118; and a non-volatile memory such as an internal flash memory device 120, plus a connector 122 for connection to a removable non-volatile memory device. The ASIC 106 can also connect to an external workstation 124, typically through a Universal Serial Bus (USB) connector 126. The digital camera 1 also includes a microcontroller 128 with which the ASIC 106 can communicate. The microcontroller 128 may communicate with a power supply source, user interface, or the like.

Other architectures for the digital camera 1 are contemplated. Each such architecture can include one or more processors, one or more volatile memory devices and one or more non-volatile memory devices. Moreover, although the method and arrangement for improving image quality that will be described hereinafter is described in connection with a digital camera, it will be clear to those skilled in the art that the present invention may also be practiced with silver halide cameras and the like.

Figure 3:
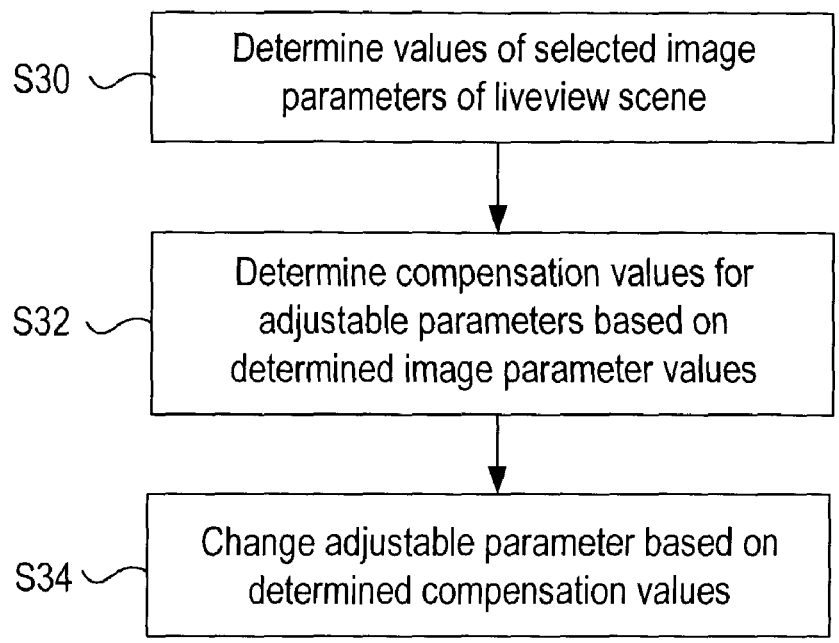
FIG. 3 is a flow diagram illustrating a method in accordance with an exemplary embodiment of present invention.

FIG. 3 is a flow chart illustrating a method for improving image quality on a display of an imaging device in accordance with an exemplary embodiment. Camera 1 may utilize several processes to adjust color hue, brightness and contrast settings in camera 1 in order to produce a liveview image that is an approximation of what the human eye would see, without taxing all the processing resources of the ASIC 106.

As noted above, an LCD controller integrated circuit (IC) 18 may be used for adjusting various display attributes, such as color hue, brightness and contrast settings, of LCD device 20. The ASIC 106 is able to send control values to the LCD controller IC 18. In this way, digital camera 1 controls the color hue, brightness, and contrast of the LCD device 20. These color hue, brightness and contrast settings may therefore be adjusted or changed via the ASIC 106 and LCD controller IC 18; hence, these setting may also be referred to as "adjustable parameters".

Each time camera 1 is energized (turned-on) and run in liveview mode, one or more default display attributes are sent to LCD controller IC 18. These display attributes may be the default settings for color hue, brightness, and contrast. These provide an initial "uncompensated" output on LCD device 20.

In FIG. 3, one or more selected image parameters of a liveview scene are measured (Step S30). These image parameters may be one or more of color hue, brightness and contrast. Measurements of these parameters (also referred to as image parameter values) may be derived from one of the liveview frames captured by CCD 102, and determined by the ASIC 106. These measurements may be performed periodically by digital camera 1 during liveview mode in order to assess lighting conditions of a liveview scene. These measurements may also be performed with the digital camera's auto-white balance algorithms.

Based on the aforementioned determined image parameter values, the ASIC 106 of camera 1 determines compensation values (Step 32) to be applied to the adjustable parameters. Specifically, ASIC 106 may derive new color hue, brightness and contrast settings that are used to determine compensation values (also referred to as "control values") that the LCD controller IC 18 is to apply to the default color hue, brightness and contrast settings.

The adjustable parameters are therefore changed (Step S34) based on the compensation value. For example, ASIC 106 writes these new control values (compensation values) to the LCD controller IC 18. The LCD controller IC 18 may adjust one or more of the LCD device 20 uncompensated color hue, brightness, and contrast settings based on the control values. By changing one or more of the color hue, brightness, and contrast settings, image quality of a liveview scene that is displayed on LCD device 20 may be improved. Once the adjustment is made, the liveview image data does not require further processing; thus computing resources within ASIC 106 may be used to perform other tasks.

Figure 4:
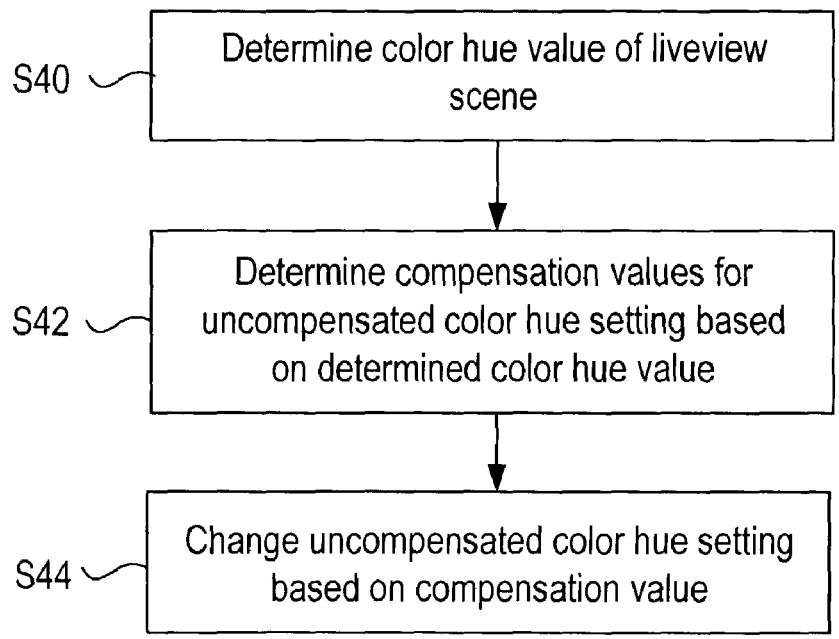
FIG. 4 is a flow diagram illustrating a method of correcting color hue settings in accordance with an exemplary embodiment of the invention.

FIG. 4 is a flow diagram illustrating a method of correcting color hue settings in accordance with an embodiment of the invention. Color hue correction may be performed using existing settings and processing in camera 1, in an effort to produce a liveview image that has an appropriate color, without taxing all the processing resources of the ASIC 106. In other words, this embodiment describes how color hue correction may be performed in digital cameras having limited processing capabilities, in order to display a liveview image on a display of the imaging device that more closely approximates what the liveview image would actually look like to the human eye.

Similar to FIG. 3, in this embodiment, once the camera 1 is energized, a default color hue setting is sent to LCD controller IC 18, in order to provide an initial "uncompensated" output on LCD device 20. A color hue measurement (value) is then calculated (Step S40) from a liveview frame of a liveview scene or image that is displayed on the LCD device 20. The color hue measurements may be performed periodically by digital camera 1 during liveview mode in order to assess lighting conditions of the scene, and also as part of the digital camera 1's auto-white balance algorithms.

Based on the calculated color hue value, the ASIC 106 of camera 1 determines compensation values (Step 42) to be applied to the default (which is also the current) color hue setting. Specifically, ASIC 106 may derive new color hue values, to be used to determine a compensation value (e.g., control value) that the LCD controller IC 18 is to apply to the default color hue setting. As will be explained in further detail below, these derived color hue settings may be stored as values in no-volatile memory 120, such as lookup table (LUT) values in a lookup table (LUT) that resides within non-volatile memory 120, for example.

In accordance with color hue measurement of Step S40, and based on the derived values from Step S42, ASIC 106 writes new control values to the LCD controller IC 18. The LCD controller IC 18 adjusts (Step S44) the LCD device 20's uncompensated hue setting based on the control values, so as to correct the color of the liveview image on LCD device 20. Since the derived color hue values have been stored as LUT values, imaging devices that do not have high performance image processing hardware (e.g., cameras having no DSP or firmware) are still able to provide a pleasant looking image to users of the imaging device, and the limited computing resources may be freed up in order to perform functions other than liveview image processing.

In a digital camera, proper color balance (or white balance) is usually determined by examining and interpreting some subset of the image data. The examination and interpretation techniques vary greatly from camera to camera and may be scene-dependent. For example, an auto-white balance algorithm may add every $N^{th}$ red, green, and blue pixel value together into three sums. The degree to which the sums differ from one another provides a measure as to how much the scene data deviates from an optimum color balance. The auto-white balance algorithm is designed to determine how to scale the red, green, and blue image data such that the three pixel sums equal one another (or at least come very close to equaling one another). This type of white balance algorithm is often referred to as a "gray world" white balance algorithm.

In the gray world algorithm, scaling factors can be determined by computing the ratios of the two smaller color sums to the largest color sum. The reciprocal of each ratio becomes the scaling factor for the respective color, with the largest color sum having a scaling factor of one. For example, if the red sum is 5000, the green sum is 4000, and the blue sum is 3500, the red scaling factor would be 1, the green scaling factor would be 1.25 (reciprocal of 4000/5000), and the blue scaling factor would be 1.43 (reciprocal of 3500/5000). In this particular example, the pixel sums, with red being the greatest sum, and green being the next greatest sum, imply that the image has a reddish orange hue. To correct this image, all the green pixels should be multiplied by 1.25 and all the blue pixels should be multiplied by 1.43. This will shift the image hue toward cyan, a complementary color to red on a color wheel, which will compensate for the original reddish orange cast.

Figure 5:
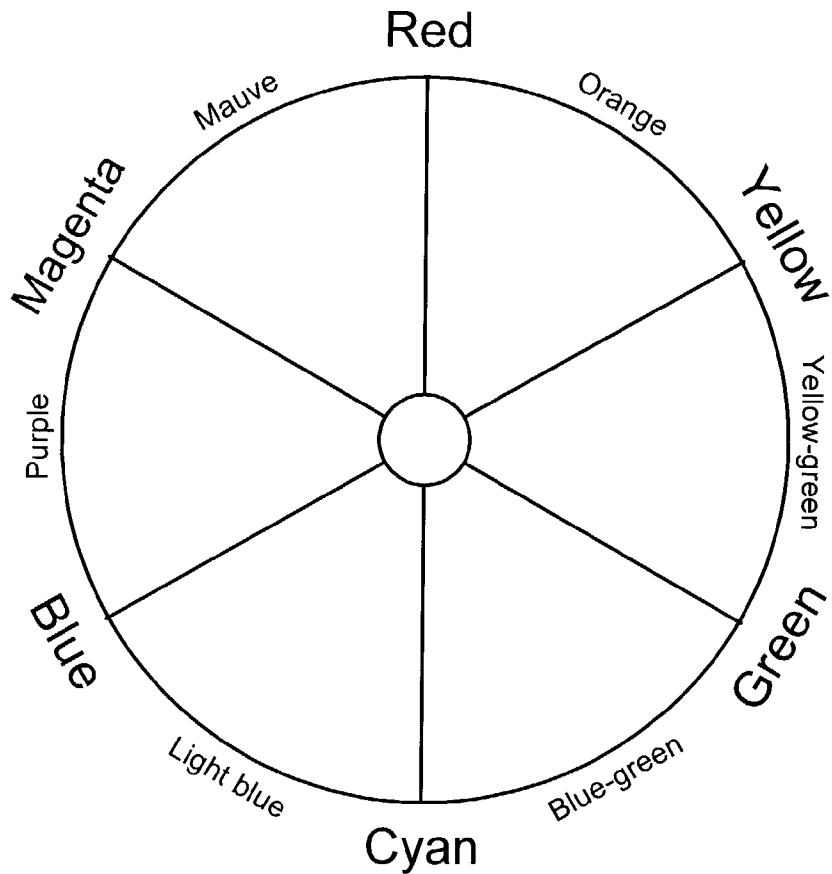
FIG. 5 is a color wheel illustrating a color neutralizing principle in accordance with the method of FIG. 4.

FIG. 5 is a color wheel illustrating a color neutralizing principle that may be used in the color correction method of FIG. 4. The present invention, in one embodiment, provides the means for correcting the color hue of the LCD device 20 so that the aforementioned pixel multiplications need not be performed. The scaling factors determined by the auto-white balance algorithm are related to the overall hue of the image. In FIG. 5, a color wheel is provided to illustrate a relationship between different color hues in a hue, saturation, brightness (HSB) color model, also referred to as an HSB color wheel, as is known.

It is well understood from color theory how to relate ratios of red, green, and blue to a specific color hue on this wheel. It is also well understood that two opposing color hues (e.g., hues that are 180 degrees apart from one another on the HSB color wheel) tend to cancel one another. This principle may be used by the embodiment of FIG. 4 in order to neutralize any color cast that may be present in the displayed image. By adjusting the LCD device 20 so that its color hue opposes that of the image, a neutral image is displayed to the user.

The determined color hue adjustment (referred to previously as the compensation value or control value) may be used to adjust the color hue setting of the LCD device 20. In one embodiment of the present invention, this is accomplished using the derived color hue values stored in the aforementioned LUT. For example, the color hue adjustment or compensation value may be calculated as follows. An auto-white balance algorithm in ASIC 106 is used to determine a plurality of new color hue values based on each measured hue color hue value. These auto-white balance algorithm-determined color hue values may be stored in memory, where each value may be associated with a corresponding liquid crystal display (LCD) hue correction value. This LCD hue correction value may represent the compensation value or control value that is applied to LCD controller IC 18 to control LCD display 20, so as to adjust the default or current color hue setting.

A current or subsequently measured color hue value may be compared to the stored auto-white balance algorithm-determined color hue values, and an LCD hue correction value corresponding to the auto-white balance algorithm-determined color hue value that is closest to the measured color hue value may be selected as the compensation value that is applied to adjust the color hue setting.

Accordingly, the derived color hue values (e.g., predetermined auto-white balance algorithm-determined color hue values) may be stored in a LUT of non-volatile memory 120. The LUT pairs color hue values with control values of the LCD device 20 that produce the opposing color hue. Therefore, during liveview, the auto-white balance algorithm periodically computes a color hue value. Once this is known, the color balance LUT is referenced in the non-volatile memory 120 and a command(s) is sent thereby to the LCD device 20, via the ASIC 106, for adjusting the color hue.

In particular, and as briefly discussed above, the computed color hue value is compared with predetermined auto-white balance hue values stored in the LUT. If the computed color hue value has an exact match in the LUT, then the image color hue may be adjusted in the LCD device 20 in accordance with a LCD hue correction value associated with the match. The LCD hue correction value may be embodied as a control value that is sent from ASIC 106 to LCD controller IC 18, for example.

However, should the computed color hue value not match an exact auto-white balance predetermined hue value stored in the LUT, values of which are listed in the following table, then a closest predetermined auto-white balance hue value and its associated LCD hue correction value may be used to control the LCD device 20. An example of such values stored in the LUT are shown in TABLE 1.

TABLE 1

| Current Image Color Hue | Auto-white Balance Determined Hue | LCD Hue Correction Value |
| --- | --- | --- |
| Magenta | 128 | 242 |
|  | 118 | 231 |
| Mauve | 107 | 220 |
|  | 96 | 209 |
| Red | 85 | 198 |
|  | 75 | 187 |
| Orange | 64 | 176 |
|  | 54 | 165 |
| Yellow | 43 | 154 |
|  | 32 | 143 |
| Yellow-green | 21 | 132 |
|  | 12 | 121 |
| Green | 0 | 110 |
|  | −12 | 89 |
| Blue-green | −21 | 78 |
|  | −32 | 67 |
| Cyan | −43 | 56 |
|  | −54 | 45 |
| Light Blue | −64 | 34 |
|  | −75 | 23 |
| Blue | −85 | 12 |
|  | −96 | 0 |
| Purple | −107 | 0 |
|  | −118 | 0 |
|  | −127 | 0 |

For example, and referring to TABLE 1, if the computed hue value was 60, which is between auto-white balance determined hue 64 for orange and hue 54 (a hue between yellow and orange) in TABLE 1, then the closest predetermined auto-white balance hue value (64) and its associated LCD hue correction value (176) is used to control the LCD device 20. As noted above, the LCD hue correction value may be embodied as a control value that is sent from ASIC 106 to LCD controller IC 18, for example.

The lookup table and its associated values are merely one example of a manner of implementing an embodiment of the present invention. As is readily apparent to those skilled in the art, other associated values may be stored in a look-up table for controlling an LCD or the like. In particular, should a specific display type require other values than those shown in TABLE 1 to control the color hue thereof, one of ordinary skill in the art would readily understand the need to modify the associated values accordingly to achieve the desired control of the display.

Although the non-volatile memory 120 is disclosed as the storage medium for the lookup table in accordance with the present invention, any memory or processing device having storage capabilities may be used to store the lookup table as desired by the implementation requirements of a given camera. Further, and although the present invention is discussed in conjunction with the use of a lookup table, other possible embodiments of the present invention may use other technologies for storing and retrieving color hue information.

For example, in an alternative embodiment of the present invention, the reference hue value with associated hue control value for the LCD device 20 may be arbitrarily stored in a storage medium for reference. Once a hue value is determined by the digital camera's 1 auto-white balance algorithm, it may be compared with the arbitrarily stored hue reference values. The closest stored hue value is chosen and its associated LCD hue correction value is used to adjust the LCD device 20.

Figure 6:
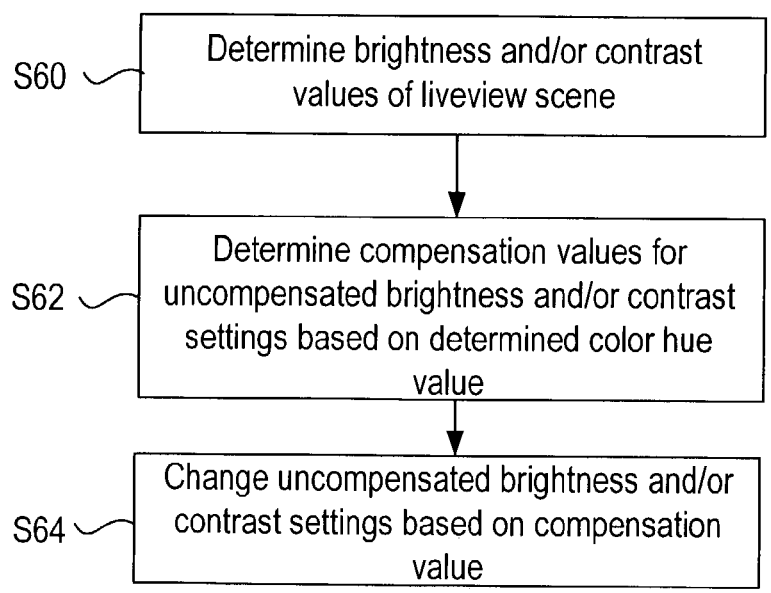
FIG. 6 is a flow diagram illustrating a method of correcting brightness and contrast settings in accordance with an exemplary embodiment of the invention.

FIG. 6 is a flow diagram illustrating a method of correcting brightness and contrast settings in accordance with an embodiment of the invention. Brightness and contrast corrections may be performed using existing imaging device settings and processing, in an effort to produce a liveview image that has appropriate brightness and contrast, without taxing all the processing resources of the ASIC 106. In other words, this embodiment describes how corrections to brightness and contrast settings may be adjusted in digital cameras having limited processing capabilities, in order to display a liveview image on the imaging device that more closely approximates what the liveview image would actually look like to the human eye (e.g., to make the image as pleasing as possible to the human eye).

As noted above, LCD controller (IC) 18 may be used for adjusting various display attributes, such as brightness and contrast settings, of LCD device 20. The ASIC 106 is able to send control values to the LCD controller IC 18. Each time camera 1 is energized (turned-on) and run in liveview mode, one or more default display attributes are sent to LCD controller IC 18. These display attributes may be the default settings for brightness, and contrast. These provide an initial "uncompensated" output on LCD device 20, and may be referred to as uncompensated brightness and contrast settings of the aforementioned "adjustable parameters".

In FIG. 6 one or more selected image parameters of a liveview scene is measured (Step S60). These image parameters may be one or more of a brightness measurement and a contrast measurement. For example, measurable brightness and contrast parameters may be one or more of the dynamic range of the liveview scene on LCD device 20, the key of the scene, the average brightness value of the scene, etc.

These measurements (also referred to as image parameter values) may be taken from one of the liveview frames captured by CCD 102, for example, and values determined by the ASIC 106. These measurements may be performed periodically by digital camera 1 during liveview mode in order to assess lighting conditions of a liveview scene. These measurements may also be performed with the digital camera's auto-white balance algorithms.

Based on the aforementioned determined image parameter values, the ASIC 106 of camera 1 determines compensation values (Step S62) to be applied to the adjustable parameters. For example, ASIC 106 may generate and refer to a histogram in order to determine compensation values (also referred to as "control values") that the LCD controller IC 18 is to apply to the uncompensated brightness and contrast settings. Such a means for generating and using a histogram to enhance a digital image is described in commonly assigned U.S. Pat. No. 6,463,173 to Tretter, the entire contents of which are hereby incorporated by reference.

For example, ASIC 106 could include a histogram of some property of a displayed image, such as a histogram containing an entry for each possible luminance value (e.g., image parameter value such as the dynamic range of the scene, the key of the scene, the average brightness value of the scene, etc.) for a particular displayed liveview scene, and each such image parameter value entry may be the number of pixels that has that particular luminance value. Also, ASIC 106 may include means, such as the contrast enhancer in Tretter, to generate a histogram which counts the number of pixels having each value in the range of values allowable for the particular property used for contrast and brightness adjustment of the image. These pixel counts may be stored in a suitable histogram array or LUT in RAM (e.g., no-volatile memory 120) for example. In this embodiment, the histogram may contain counts of pixels having each valid luminance value.

Based on a comparison of the measured image parameters to the histogram, compensation values may be determined. These compensation values may be output directly as a function of the histogram, and/or may be control values calculated in advance for a plurality of measured brightness and contrast parameters (e.g., luminance values and their corresponding entries in the histogram), as based on the histogram. The control values may be stored in a suitable array or LUT within non-volatile memory 120, for example.

The adjustable parameters are therefore changed (Step S64) based on the compensation value. For example, ASIC 106 writes these new control values (compensation values) to the LCD controller IC 18. The LCD controller IC 18 may adjust one or more of the LCD device 20 uncompensated brightness and contrast settings based on the control values that were determined for brightness and contrast. Once the adjustment is made, the liveview image data does not require further processing; thus computing resources within ASIC 106 may be used to perform other tasks.

Therefore, the method and arrangement in accordance with the invention improves image quality on a display of an imaging device, without using either a dedicated liveview hardware pipeline or a high performance microprocessor such as a digital signal processor (DSP) in order to manipulate all the data of the liveview image frames in a manner similar to that performed by the hardware pipeline. By using existing adjustable settings and processing in the imaging device, manufacturing cost, and hence cost to the consumer, is lowered, as less processing power is required to improve image quality, as compared to device incorporating more complicated DSPs and dedicated liveview hardware pipelines. Additionally, less image device exposure time (e.g., length of time a charged coupled device (CCD) is exposed to the scene) is required as compared to devices incorporating high performance processing, which limits any reduction in frame rate in order to maintain a realistic video product.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A method of correcting a color hue setting of a display unit in an imaging device for improving image quality of the liveview scene displayed on a display unit of the imaging device, comprising the steps of:

determining a color hue setting of the imaging device;

measuring a color hue value of image data representing the liveview scene;

calculating a compensation value based on the measured color hue value;

providing the image data representing the liveview scene to the display unit; and adjusting the color hue setting of the display unit in accordance with the calculated compensation value without having to adjust the image data being provided to the display unit.

2. The method of claim 1, wherein said calculating step further includes:
  using an auto-white balance algorithm to determine a plurality of new color hue values based on each measured hue color hue value,
  storing the auto-white balance algorithm-determined color hue values in memory, associating a liquid crystal display (LCD) hue correction value with each stored auto-white balance algorithm-determined color hue value, the LCD hue correction value representing the compensation value,
  comparing a subsequently measured color hue value to the stored auto-white balance algorithm-determined color hue values, and
  selecting the LCD hue correction value of the auto-white balance algorithm-determined color hue value that is closest to the measured color hue value.

3. The method of claim 2, wherein the adjusting step further includes applying the selected LCD hue correction value to the color hue setting to improve image quality of the liveview scene.

4. The method of claim 1, wherein the step of calculating a compensation value is automatically performed.

5. The method of claim 4, wherein the automatically performed step of calculating is performed by a component of the imaging device.

* * * * *

UNITED STATES PATENT AND TRADEMARK OFFICE
CERTIFICATE OF CORRECTION

| | | |
|---|---|---|
| PATENT NO. | : 7,355,611 B2 | Page 1 of 1 |
| APPLICATION NO. | : 10/303747 | |
| DATED | : April 8, 2008 | |
| INVENTOR(S) | : Mark J Bianchi et al. | |

It is certified that error appears in the above-identified patent and that said Letters Patent is hereby corrected as shown below:

In column 3, line 42, delete "(Step 32)" and insert -- (Step S32) --, therefor.

Signed and Sealed this

Twenty-eighth Day of April, 2009

JOHN DOLL
*Acting Director of the United States Patent and Trademark Office*